Sept. 29, 1942.   C. HARDEBECK   2,297,408
FLUID METER
Filed Nov. 10, 1939

Inventor
Carl Hardebeck
By Bryant & Lowry
Attorneys.

Patented Sept. 29, 1942

2,297,408

UNITED STATES PATENT OFFICE 2,297,408

FLUID METER

Carl Hardebeck, Aachen, Germany; vested in the Alien Property Custodian

Application November 10, 1939, Serial No. 303,895
In Germany November 4, 1938

2 Claims. (Cl. 73—202)

Part-flow quantity passed gauges are known, in which in the main conduit a stationary throttling device or an adjustable throttling device which in this case is equipped with a scale is mounted and a flow-meter is provided in a by-pass of the main conduit so that the two flows are in a predetermined constant proportion to one another and the smaller flow is then directly measured. The quantity passed gauge can consist for instance of a nozzle in combination with ringscales.

The present invention has for its object, to avoid in arrangements of the above mentioned kind, when alterations of the state of the medium occur, any recalculation and correction or special adjustings of apparatus elements and to obtain, in spite of the fluctuations of the state, always a clear indication of the quantity passed, for instance related to the normal state.

The effect of this arrangement will be hereinafter explained by an example.

The quantity passed through the throttle of the main conduit follows the laws for the quantity passed through nozzles and therefore $V = A \times \sqrt{h}$ if $V$ is the quantity passed, $A$ a constant and $h$ the pressure difference on the throttle.

The capillary tube, which according to the invention is mounted in the by-pass conduit, does not follow, as regards quantity passed, the above law but the Poiseuville law, and the passed quantity $V_1$ is therefore, if $b$ is a constant decisive for the by-pass conduit and $h$ again the pressure difference $V_1 = b \times h$. The instrument may, for instance, be calibrated for air of atmospheric pressure and the flow through the main conduit may amount at a certain gauge pressure difference to 10 m.³/h. If then air of 1 atmosphere pressure is conducted through the instrument at the same pressure difference, the quantity passing through the conduit amounts then to $$\frac{10 \ m.^3/h.}{\sqrt{2}}$$

air of two atmospheres absolute, or, recalculated to atmospheric pressure, to $$10 \times \sqrt{2} \ m.^3/h. = 14.14 \ m.^3/h$$

The flow meter in the by-pass conduit may be adjusted so that the quantity passed relation of main conduit and by-pass conduit amounts to 100:1. When air from atmospheric pressure flows through the apparatus, the through-flow is then 10 m.³/h. = 1000 l./h. The flow meter in the by-pass shows therefore a through-flow of 1000 l./h., if the through flow through the main conduit amounts to 10 m.³/h.

If then air of 1 atmosphere over-pressure is sent through the apparatus the through-flow through the by-pass is 10 l./h., if the through flow through the main conduit amounts again to the volume 10 m.³/h., the through-flow in the by-pass being, however, of 1 atmosphere over-pressure or 2 atmospheres absolute. This 10 l./h. air of 2 atmospheres absolute produce in the flow meter gauge for atmospheric pressure an indication of 1414 l./h., as the indication of the flow takes place according to the nozzle law.

The through-flow through the main conduit amounts, relative to the atmospheric pressure to $10 \times \sqrt{2} = 14.14$ m./h. The indication of the flow meter shows therefore multiplied with the constant relation factor the through-flow quantity through the main conduit.

This calculation may be repeated for all pressures in a similar manner. The instrument therefore always shows the quantity related to the normal condition, independent of the compression.

In the example mentioned above the main throttle was assumed to be stationary, so that the different quantities passed were indicated by different positions of the quantity passed gauge.

The possibility of applying this quite novel measuring apparatus is very extensive. For measuring the quantity passed any quantity passed gauges of known type can serve, such as ring-scales, difference pressure meters and so forth, provided the pressure consumption of the quantity passed gauge is kept small in proportion to that of the capillary tube. The indications of the quantity passed guages can evidently be used also for recording and regulating.

In the accompanying drawing two embodiments of the invention are illustrated by way of example.

Figure 1:
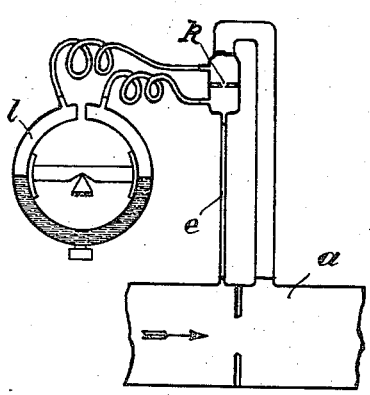
Fig. 1 shows an arrangement, in which in the by-pass conduit to the main conduit $a$ the capillary tube $e$ and as quantity passed gauge an orifice plate $k$ in connection with an indicator $l$ for the difference pressure constructed as a ring scale is mounted.
Figure 2:
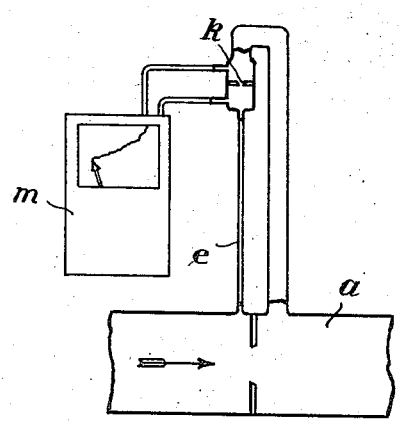
Fig. 2 shows a construction similar to that shown in Fig. 1, comprising further a recording device $m$ for recording the quantity of gas relative to the normal condition.

I claim:

1. A fluid meter, comprising in combination, a main conduit, a throttle in the main conduit, a by-pass conduit communicating at its ends with the main conduit on opposite sides of said throttle, a flow meter in said by-pass conduit, a capillary tube in the by-pass conduit, the pressure drop of the flow meter being low compared to the differential pressure across the capillary tube, the flow meter consisting of an orifice plate and a ringscale correlated with said orifice plate.

2. A fluid meter as specified in claim 1, wherein the ringscale is provided with a recording device.

CARL HARDEBECK.